US011685327B2

(12) United States Patent
Steinke et al.

(10) Patent No.: US 11,685,327 B2
(45) Date of Patent: Jun. 27, 2023

(54) SEAT BELT ARRANGEMENTS FOR A MOTOR VEHICLE

(71) Applicant: JOYSON SAFETY SYSTEMS GERMANY GMBH, Aschaffenburg (DE)

(72) Inventors: Norman Steinke, Berlin (DE); Yves Clauss, Potsdam (DE); Tibor Leupold, Berlin (DE); Jan Höfer, Berlin (DE); Mingxi Yan, Berlin (DE); Tobias Pausch, Berlin (DE); Koshan Mahdi, Berlin (DE); Gert Weller, Berlin (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 80 days.

(21) Appl. No.: 17/278,277

(22) PCT Filed: Sep. 5, 2019

(86) PCT No.: PCT/EP2019/073715
§ 371 (c)(1),
(2) Date: Mar. 19, 2021

(87) PCT Pub. No.: WO2020/057992
PCT Pub. Date: Mar. 26, 2020

(65) Prior Publication Data
US 2021/0354647 A1    Nov. 18, 2021

(30) Foreign Application Priority Data

Sep. 20, 2018  (DE) ...................... 10 2018 123 209.8

(51) Int. Cl.
*B60R 21/18* (2006.01)
*B60R 21/013* (2006.01)
(Continued)

(52) U.S. Cl.
CPC ............ *B60R 21/18* (2013.01); *B60R 21/013* (2013.01); *B60R 21/20* (2013.01); *B60R 22/26* (2013.01);
(Continued)

(58) Field of Classification Search
CPC ..................................................... B60R 21/18
See application file for complete search history.

(56) References Cited

U.S. PATENT DOCUMENTS

| 6,382,666 B1 | 5/2002 | Devonport |
| 2007/0080528 A1 | 4/2007 | Itoga et al. |

(Continued)

FOREIGN PATENT DOCUMENTS

| CN | 107284391 A | 10/2017 |
| DE | 102011 116 146 A1 | 4/2013 |

(Continued)

OTHER PUBLICATIONS

International Search Report and Written Opinion dated Dec. 3, 2019 issued in a related International Patent Application No. PCT/EP2019/073715; filed Sep. 5, 2019.

(Continued)

*Primary Examiner* — Nicole T Verley
(74) *Attorney, Agent, or Firm* — Gordon Rees Scully & Mansukhani, LLP

(57) ABSTRACT

A seat belt arrangement for a motor vehicle, with at least one seat belt for the protection of a vehicle occupant seated on a vehicle seat; at least one inflatable gas bag arranged on the seat belt for protecting the vehicle occupant. The gas bag includes a passage through which the seat belt extends and to which at least one inflatable chamber of the gas bag adjoins, wherein during or after inflation of the gas bag at least a sub-section of a wall of the passage presses indirectly and/or directly against the seat belt such that the gas bag (Continued)

couples to the seat belt and follows an extension movement of the seat belt and hence a movement of the vehicle occupant, and wherein the seat belt is at least partly surrounded by a casing element at least within the passage.

13 Claims, 11 Drawing Sheets

(51) Int. Cl.
    *B60R 21/20*         (2011.01)
    *B60R 22/26*         (2006.01)
    *B60R 21/01*         (2006.01)
    *B60R 22/18*         (2006.01)

(52) U.S. Cl.
    CPC ............... *B60R 2021/01211* (2013.01); *B60R 2022/1818* (2013.01)

(56) References Cited

U.S. PATENT DOCUMENTS

| | | |
|---|---|---|
| 2011/0169250 A1 | 7/2011 | Breuninger et al. |
| 2016/0280171 A1 | 9/2016 | Moeller et al. |
| 2017/0282833 A1 | 10/2017 | Nagatsu |
| 2020/0180539 A1 | 6/2020 | Korth |
| 2021/0300278 A1 * | 9/2021 | Hayashi .................. B60R 21/18 |

FOREIGN PATENT DOCUMENTS

| | | | |
|---|---|---|---|
| DE | 10 2017 202 644 A1 | 10/2017 | |
| DE | 102017216 180 A1 | 3/2019 | |
| DE | 102021000984 A1 * | 4/2021 | |
| EP | 1209043 A1 * | 5/2002 | ............ B60R 21/18 |
| EP | 1 054 791 B1 | 8/2005 | |
| EP | 3075610 A1 * | 10/2016 | ............ B60R 21/18 |
| EP | 3505403 A1 * | 7/2019 | ............ B60R 22/00 |
| GB | 2408241 A * | 5/2005 | ............ B60R 21/18 |
| JP | 2000-142303 A | 5/2000 | |
| JP | 2000142303 A * | 5/2000 | |
| JP | 3521769 B2 * | 4/2004 | |
| JP | 5239604 B2 * | 7/2013 | |
| JP | 5244751 B2 * | 7/2013 | |
| JP | 2017087768 A * | 5/2017 | |
| WO | 2003/016104 A1 | 2/2003 | |
| WO | WO-2008139655 A1 * | 11/2008 | ............ B60R 21/18 |
| WO | 2010/007055 A1 | 1/2010 | |
| WO | WO-2013099888 A1 * | 7/2013 | ........... B60N 2/4235 |
| WO | WO-2016002483 A1 * | 1/2016 | ............ B60R 21/12 |
| WO | WO-2016194506 A1 * | 12/2016 | |
| WO | 2017/207621 A1 | 12/2017 | |
| WO | 2018/216663 A1 | 11/2018 | |

OTHER PUBLICATIONS

Chinese First Office Action dated Sep. 15, 2022 issued in related Chinese Application No. 201980060800.3.

* cited by examiner

SEAT BELT ARRANGEMENTS FOR A MOTOR VEHICLE

CROSS-REFERENCE TO A RELATED APPLICATION

This application is a National Phase Patent Application of International Patent Application Number PCT/EP2019/073715, filed on Sep. 5, 2019, which claims priority of German Patent Application Number 10 2018 123 209.8, filed on Sep. 20, 2018.

BACKGROUND

This disclosure relates to seat belt arrangements for a motor vehicle.

A seat belt arrangement with a gas bag module arranged on a seat belt of the seat belt arrangement is known, for example, from DE 10 2017 202 644 A1. On a module housing a locking mechanism is provided, by which the seat belt can be coupled to the module housing. By coupling the seat belt to the module housing a relative movement between the seat belt and the gas bag module is prevented, so that the gas bag module follows an extension movement of the seat belt. To enable gas to be introduced into the gas bag of the gas bag module even in this case, a gas line with an excess length is used. However, the realization of such a seat belt arrangement is very expensive.

SUMMARY

The problem underlying the proposed solution consists in creating a seat belt arrangement with a gas bag arranged on a seat belt, which can be implemented in the simplest possible way.

This problem is solved by the provision of seat belt arrangements with the features as described herein.

Accordingly, there is provided a seat belt arrangement for a motor vehicle, comprising
- at least one seat belt for the protection of a vehicle occupant seated on a vehicle seat;
- at least one inflatable gas bag arranged on the seat belt for the protection of the vehicle occupant, wherein
- the gas bag includes a passage through which the seat belt extends and to which at least one inflatable chamber of the gas bag adjoins, wherein during or after inflation of the gas bag at least a sub-section of a wall of the passage presses indirectly and/or directly against the seat belt in such a way that the gas bag couples to the seat belt (in particular clampingly) and follows an extension movement of the seat belt and hence a movement of the vehicle occupant, and wherein the seat belt is at least partly surrounded by a casing element at least within the passage.

During a collision of the vehicle and a forward displacement of the vehicle occupant as a result of the collision, the gas bag follows the extension movement of the seat belt (i.e. unwinding of the seat belt from a winding device) associated with the forward displacement of the vehicle occupant due to the coupling to the seat belt, so that the position of the inflated gas bag relative to the vehicle occupant changes as little as possible. In normal operation of the vehicle (before an activation of the gas bag), however, a relative movement between the seat belt and the gas bag is possible; e.g. to facilitate fastening of the seat belt. In particular, the gas bag is arranged on a shoulder portion of the seat belt, wherein the seat belt at least partly extends through the passage of the gas bag with the shoulder portion.

In particular, as a result of the internal pressure in the chamber, a surface pressure is obtained between the chamber (e.g. over sub-sections of a wall of the passage) and the seat belt located in the passage (in particular the passage not to be filled with gas); and this at least partly indirectly via the casing element arranged in the passage. This surface pressure causes the chamber and hence the gas bag to be clamped to the seat belt.

The passage (its wall) is formed, for example, by a flexible element which at least partly extends through the chamber or adjoins the chamber. For example, the flexible element is of tubular shape and forms a tunnel-shaped passage. For example, the flexible element separates an interior, for example non-inflatable volume of the passage through which the seat belt extends from an inflatable volume of the chamber. This separation in particular is effected in a gas-tight way.

The flexible element is formed, for example, by a fabric or film material. It is conceivable that the flexible element is connected (e.g. sewn) to at least one material layer (gas bag layer) of the chamber, which delimits the inflatable volume of the chamber (in particular to the outside), wherein this connection in particular is effected in a gas-tight way.

For example, an opening is formed in the material layer of the gas bag, wherein the flexible element is connected (as mentioned, in particular sewn) to the material layer in the region of the opening in such a way that the opening forms an access to the passage.

It is also possible that the inflatable volume of the chamber is delimited by two material layers connected to each other by an edge seam, wherein an opening is formed between the material layers and the flexible element is attached to at least one of the material layers by means of the edge seam and/or a tab of the edge seam such that the opening forms an access to the passage.

The casing element can also protrude from the passage and for example form a guide for the seat belt outside the passage. For example, the seat belt is guided through the casing element outside the passage along an inflatable chamber and/or a gas inlet area of the gas bag (see explanations of the inlet area below). In addition, the casing element can be designed in such a way that its cross-section is adapted to the shape of the seat belt. For example, the casing element has two sides which extend at least approximately parallel to the seat belt. It is also conceivable that the casing element approximately has the shape of an elongated oval.

According to another embodiment of the solution, the casing element is provided with an inner friction-reducing coating (facing the seat belt). For example, the coating comprises silicone or is formed from silicone. It is also conceivable that the casing element is formed from silicone or another material which has the lowest possible coefficient of friction with the material of the seat belt.

The sides of the casing element extending parallel to the seat belt can also at least sectionally be designed uneven. What is conceivable is an at least approximately undulating or sawtooth-like course of these sides of the casing element, i.e. the casing element can have a undulating (e.g. sinusoidal or trapezoidal) structure (in particular viewed in a cross-section along the direction of extension of the seat belt). With this embodiment of the casing element, in essence only protruding portions of the casing element are in contact with the seat belt prior to inflation of the gas bag in the direction of the seat belt, so that the lowest possible frictional forces act between the casing element and the seat belt when the belt is unwound. When the gas bag is inflated, the casing element is pressed against the seat belt so that it rests flat against the same and a greater frictional force occurs between the casing element and the seat belt.

For example, the distance between adjacent wave crests or wave troughs is less than 15 mm or less than 10 mm, wherein the wavelength and/or the amplitude of the wave structure can vary depending on the location. It is also imaginable that the undulating structure of an upper portion of the casing element is different from the undulating structure of a lower portion of the casing element. For example, the upper portion is trapezoidal and the lower portion is sinusoidal, so that the upper portion is more resistant to bending than the lower portion. With this embodiment, for example, the upper part of the encased gas bag might be lifted from the shoulder of the vehicle occupant by means of a lifting device (lifter); in particular to improve comfort when using the seat belt arrangement.

Furthermore, an inner portion of the casing element (in particular corrugated as explained above) (for example, up to about 25% of its wall thickness) might be formed from a low-friction material, while the remaining portion of the casing element (for example, up to about 75% of its wall thickness) is formed from another material; for example from a material which influences (in particular increases) the bending stiffness and/or tensile strength. This might eliminate the need for an aftertreatment of the casing element (for example, the application of a coating made of a low-friction material).

It is also possible that a side of the casing element facing away from the vehicle occupant extends convexly (in particular, viewed in cross-section perpendicularly to the course of the seat belt). The side of the casing element facing the vehicle occupant, on the other hand, can be at least approximately planar.

According to another embodiment of the solution, a first end of the passage adjoins a first opening of the gas bag and a second end of the passage adjoins a second opening of the gas bag, wherein the seat belt enters the passage via the first opening and exits from the passage through the second opening. For example, the first and the second opening are formed in the same material layer (gas bag layer) of the gas bag (for example, in a gas bag layer facing the vehicle occupant). However, it is also possible that the openings are located in different gas bag layers of the gas bag; for example, the first opening through which the seat belt enters the passage is formed in a gas bag layer facing the vehicle occupant, while the second opening through which the seat belt exits from the passage is located in the gas bag layer facing away from the vehicle occupant.

The seat belt arrangement according to the solution can also comprise a fixing element by means of which the gas bag can be attached (in particular releasably) to a component of a vehicle seat; for example, in the manner of a latching connection. Via the fixing element, for example, an attachment to a guiding device of the vehicle seat, in which the seat belt is guided, is obtained. In particular, the guiding device includes a guide channel for guiding the seat belt, wherein the guide channel for example is positioned above a shoulder of the vehicle occupant seated on the vehicle seat. It is also possible that the seat belt arrangement according to the solution comprises a gas supply line (cf. the second aspect of the solution explained below), which for example proceeding from a gas generator for inflating the gas bag extends in the direction of the guiding device.

In particular, the fixing element includes a through opening through which the seat belt extends and/or a through opening through which a gas inlet area of the gas bag (see explanations on this below) extends.

It is also possible that the seat belt arrangement has an outer casing which at least partly surrounds the gas bag. For example, the outer casing is formed from a fabric or film material. In addition, the seat belt in particular also at least partly runs through the outer casing.

It is also conceivable that the outer casing is fixed to the fixing element. It is also possible that the outer casing detaches or tears open from the gas bag during an extension movement of the seat belt after the gas bag has been coupled to the seat belt, so that the gas bag can follow the extension movement of the seat belt.

Alternatively or additionally, it is also possible that during an extension movement of the seat belt after coupling of the gas bag, the fixing element is released from the vehicle seat component and thus does not counteract any movement of the gas bag with the seat belt.

According to another embodiment of the solution, the seat belt arrangement comprises at least one connecting element (for example in the form of a latching or clamping element) by which the outer casing and the casing element are connected to each other. It is conceivable that the casing element and/or the outer casing each have at least one opening into which corresponding connecting portions (for example hooks or other protrusions) of the connecting element engage. There can also be provided a cover element which is connected (for example, latched) to the connecting element and which in particular serves to cover components (for example, the above-mentioned connecting portions) of the connecting element (e.g., for aesthetic reasons and/or to prevent the connecting element from snagging with the clothing of the vehicle occupant).

Furthermore, the connecting element comprises a (for example slot-like) through-opening through which the seat belt extends. The cover element likewise can include an opening for the seat belt.

In another exemplary embodiment of the solution, the gas bag includes a head area extending above a thorax area, wherein the head area has at least one indentation. The indentation can extend as a non-fillable opening through the entire gas bag or through only a part of the gas bag, as viewed from the vehicle occupant. For example, the indentation is annularly surrounded by portions of the head area and the thorax area. At least one (in particular flat) element can be arranged in the indentation—in particular at a distance from the gas bag layer facing the vehicle occupant— which at least partly closes the opening and connects portions of one or more gas bag layers (wall parts) of the gas bag, which delimit the opening, to each other and thus in particular limits an expansion of the indentation at immersion of the head of the vehicle occupant.

The indentation in particular is elongated, extending for example in the vertical direction.

According to a second aspect, the solution relates to a seat belt arrangement for a motor vehicle, in particular as described above, comprising at least one seat belt for the protection of a vehicle occupant seated on a vehicle seat;

at least one inflatable gas bag arranged on the seat belt for the protection of the vehicle occupant;

a gas generator for inflating the gas bag;

a gas supply line, via which gas released by the gas generator can be supplied to the gas bag, wherein the gas bag couples to the seat belt in response to a signal from a pre-crash or crash sensor system of the motor vehicle or as a result of inflation, so that the gas bag follows an extension movement of the seat belt and hence a movement of the vehicle occupant, wherein the gas supply line is connected to an inlet area of the gas bag in such a way that the inlet area detaches from an end of the gas supply line when the seat belt is pulled out by a predeterminable extension length after coupling of the gas bag to the seat belt.

In particular, the inlet area of the gas bag is connected to at least one inflatable chamber of the gas bag, so that after triggering the gas generator, gas flows from the gas generator via the inlet area into the inflatable chamber. For example, the inlet area at least sectionally is of oblong, in particular tubular shape.

It is also possible that the end of the gas supply line is formed by a rigid (in particular cylindrical) end piece to which the inlet area of the gas bag is connected. For example, at least a portion of the end piece protrudes into an end portion of the inlet area of the gas bag. It is also conceivable that the gas generator-side end of the inlet area of the gas bag is releasably connected to the end of the gas supply line (in particular to the end piece mentioned), for example by a releasable clamp connection. The clamp connection is released when the seat belt is extended beyond the predeterminable extension length.

In particular, the inlet area of the gas bag is configured in such a way that, when the seat belt is pulled out after the gas bag has been coupled to the seat belt as a result of a collision of the vehicle, gas can be introduced via the inlet area until the predeterminable pull-out length is reached.

For example, the inlet area includes a portion which provides an additional length that allows an inflatable chamber to be removed from the gas supply line without interrupting the introduction of gas into the chamber when the seat belt is extended until the predeterminable extension length is reached.

It is conceivable that the portion providing the additional length is formed by a gathered sub-section of the inlet area. For example, the gathered sub-section is stockpiled on the gas supply line, for example on the above-mentioned end piece of the gas supply line. It is possible that the gathered sub-section of the inlet area is releasably connected to the gas supply line by means of a fastening element (for example in the form of a fixing strap). The fastening element has, for example, a predetermined breaking point (for example, a predetermined tearing point) which breaks open (in particular tears open) when the seat belt is pulled out, in order to allow the gathered sub-section to be tightened.

It is also possible that the portion of the inlet area providing the additional length does not extend in a straight line, but rather has at least one loop-like sub-section before the seat belt is pulled out, for example, or extends in a meander-shaped manner, with the portion tightening as the seat belt is pulled out. It is also conceivable that the gas supply line (in particular the above-mentioned end piece of the gas supply line) protrudes into the inlet area of the gas bag with a portion whose length is less than the additional length required to maintain the gas introduction into the chamber when the seat belt is pulled out after the gas bag has been coupled to the seat belt. For example, the length of the portion of the gas supply line protruding into the inlet area is smaller than the length of the distance covered by the gas bag when the seat belt is pulled out to the predeterminable extension length.

The additional length required can be significantly less than with previously known solutions, since merely an extension length up to the predeterminable extension length or a forward displacement of the vehicle occupant up to a corresponding predeterminable occupant position needs to be covered. The predeterminable occupant position or the predeterminable extension length at which the inlet area of the gas bag detaches from the gas supply line is determined in particular in dependence on the gas delivery characteristic of the gas generator. For example, at the time of the detachment of the inlet area of the gas bag from the supply line no more gas or at least substantially no more gas should be provided by the gas generator.

According to another development of the solution, a valve (e.g. in the form of a non-return or one-way valve) is present, which counteracts an outflow of gas from the gas bag after a detachment of the inlet area of the gas bag from the gas supply line (in particular as a result of the predetermined extension length being exceeded). In particular, the valve is activated when the inlet area of the gas bag is detached from the gas supply line. For example, the valve is arranged in the area of the connection of the gas supply line (in particular of the end piece mentioned) and the inlet area of the gas bag. It is also conceivable that the valve is arranged inside the inlet area of the gas bag or is formed by the inlet area.

It is also conceivable that the extent of the area in which the additional length is provided does not exceed a predeterminable distance from an inflatable chamber of the gas bag. For example, the additional length is provided in an area between the inflatable chamber and a guiding device arranged on the vehicle seat for guiding the seat belt. This eliminates the need for expensive mechanisms for deflecting or releasing the gas supply line, for example. It is also conceivable that larger flow cross-sections can be realized with the introduction of gas via the inlet area of the gas bag.

The embodiments of the seat belt arrangement of the first aspect of the solution as explained above can of course be used analogously for the further development of the seat belt arrangement of the second aspect of the solution. It should also be noted that the coupling of the gas bag to the seat belt can be effected by action of the internal pressure in the gas bag, analogous to the first aspect of the solution. However, other coupling mechanisms are also conceivable. For example, the German Patent Application 10 2017 216 180.9 of Sep. 13, 2017 discloses coupling mechanisms which can be used for the development of the seat belt arrangement of the second aspect of the solution. In so far, reference is made herewith expressly to the patent application DE 10 2017 216 180.9.

According to a third aspect, the solution relates to a seat belt arrangement for a motor vehicle, in particular as described above, comprising at least one seat belt for the protection of a vehicle occupant seated on a vehicle seat;

at least one inflatable gas bag arranged on the seat belt for the protection of the vehicle occupant;

an outer casing which at least partly surrounds the gas bag, wherein the gas bag couples to the seat belt in response to a signal from a pre-crash or crash sensor system of the motor vehicle or as a result of inflation, so that the gas bag follows an extension movement of the seat belt and hence a movement of the vehicle occupant; and at least one sensor arranged on the outer casing for detecting vital data of the vehicle occupant and/or at least one ambient variable and/or a signal generator.

For example, the sensor is used to determine a heart rate, a respiratory activity, a temperature, and/or a movement of the vehicle occupant. It is also conceivable that the sensor is configured to determine an ambient variable, for example a temperature or a substance concentration (for example in the breathing air of the vehicle occupant). For example, the sensor is an acceleration sensor, microphone, or a radar sensor, although the solution is of course not limited to any particular type of sensor.

For example, the at least one sensor is arranged on a portion of the outer casing facing the vehicle occupant, wherein the sensor can be arranged on the outer or inner side of this portion. In particular, a sensor positioned in this way serves the above-mentioned determination of a heart rate, a respiratory activity, a temperature and/or a movement of the vehicle occupant. However, it is also possible that the sensor is mounted on a portion of the outer casing facing away from the vehicle occupant, wherein the sensor can in turn be attached to an outer or inner side of this portion. A sensor positioned in this way, which is designed in particular in the form of a microphone, can be used, for example, to analyze the breathing air of the vehicle occupant or to determine ambient variables (such as the ambient temperature). Of course, a plurality of sensors can be present, which are mounted on different portions of the outer casing.

It is pointed out that a "sensor" should not necessarily be understood to mean only one sensing element, but also, for example, a unit (a module) which comprises further (in particular electronic) components beside the sensing element (such as a semiconductor component). For example, the sensor includes a sensing component which is arranged on a printed circuit board. It is also conceivable that a plurality of sensing elements are present, which are arranged on a common printed circuit board, for example. The same applies for the signal generator.

The signal generator for example is an actuator with which (in particular haptic) signals can be transmitted to the vehicle occupant, or an acoustic transducer (e.g. a loudspeaker, for example of a hands-free system).

The sensor and/or the signal generator is contacted in particular by means of at least one electrical line, wherein the electrical line in particular represents a data line and/or a power line. For example, the electrical line at least sectionally extends along an outer side of the outer casing, wherein it can be attached there (for example be woven in). However, it is also conceivable that the electrical line at least sectionally extends on an inner side of the outer casing.

It is also conceivable that the seat belt arrangement has an energy storage device for storing electrical energy, which is used to supply electrical power to the at least one sensor and/or the signal generator. In addition, the seat belt arrangement can also comprise a radio module which can be used to wirelessly transmit sensor data to a receiver, for example.

According to another embodiment of the solution, the electrical line has an additional length which, when the seat belt is pulled out, allows the gas bag to move with the seat belt without interrupting the electrical connection between the sensor and/or the signal generator and the vehicle electronics. For example, the additional length is formed by a folded or coiled portion of the electrical line.

The solution also relates to a motor vehicle with a seat belt arrangement according to the solution.

BRIEF DESCRIPTION OF THE DRAWINGS

The solution will be explained in detail below by means of exemplary embodiments with reference to the Figures.

DETAILED DESCRIPTION

Figure 1:
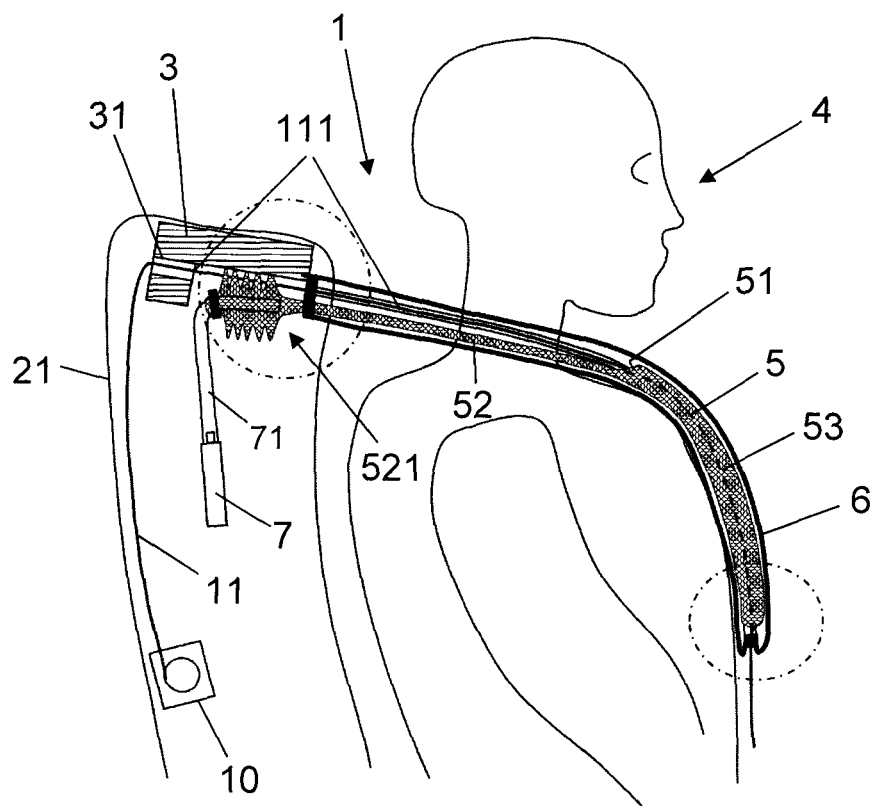
FIGS. 1 to 3 show different states of a seat belt arrangement according to the solution.

FIG. 1 shows a seat belt arrangement 1 according to an exemplary embodiment of the solution, wherein the seat belt arrangement 1 comprises a seat belt 11 which can be wound onto a winding device 10 in a manner customary per se. The seat belt 11 is guided in a guiding device 3 arranged on a backrest 21 of a vehicle seat; and in such a manner that a shoulder portion 111 of the seat belt 11 extends through a guide channel 31 of the guiding device 3 towards a vehicle occupant 4 seated on the vehicle seat. In particular, the guide channel 31 is located above a shoulder of the vehicle occupant 4 so that the shoulder portion 111 is guided over the shoulder of the vehicle occupant 4.

An inflatable gas bag 5 accommodated in an outer casing 6 made of a flexible material, such as a fabric, is arranged on the shoulder portion 111 of the seat belt 11. The gas bag 5 includes a passage 51 in which a casing element 8 (cf. for example the detail view of FIGS. 4 and 5) is located. The shoulder portion 111 extends through the passage 51 and at least partly within the casing element 8. FIG. 1 shows the seat belt arrangement 1 after the seat belt 11 has been fastened, but before the gas bag 5 is activated.

A gas generator 7 located in the backrest 21 serves to fill the gas bag 5 with gas, wherein gas released by the gas generator 7 can flow into at least one inflatable chamber 53 of the gas bag 5 via a gas supply line 71 and a tubular inlet area 52 of the gas bag 5.

The passage 51 of the gas bag 5 and the casing element 8 located in the passage 51 are designed in such a way that the seat belt 11 is movable relative to the gas bag 5 before the gas bag 5 is inflated, i.e. before the gas generator 7 is activated. However, during an inflation of the gas bag 5 or after an inflation of the gas bag 5, at least a sub-section of a wall of the passage 51 delimiting an inner volume of the passage 51 with respect to the inflatable chamber 53 of the gas bag 5 is pressed against the seat belt 11 via the casing element 8 by action of the internal pressure existing in the gas bag 5, so that the chamber 53 and hence the gas bag 5 is coupled to the seat belt 11. This coupling leads to the fact that the gas bag 5 follows an extension movement of the seat belt 11 as a result of a forward movement of the vehicle occupant 4 due to a collision.

Figure 7:
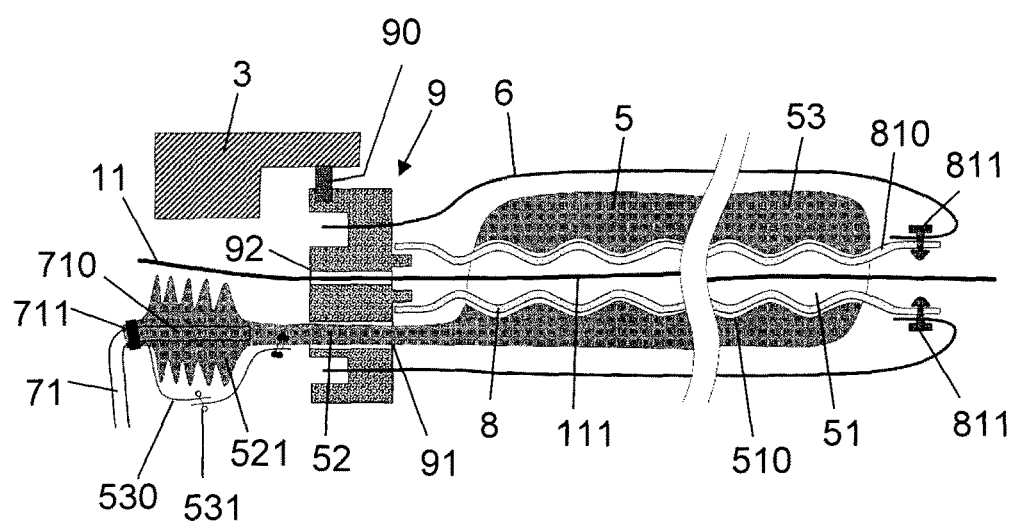
FIG. 7 shows a partial sectional representation of a seat belt arrangement according to the solution.

In order to be able to maintain the filling of the chamber 53 with gas even during such a forward displacement of the gas bag 5, the inlet area 52 of the gas bag 5 comprises a gathered portion 521 which provides an additional length of the inlet area 52, which allows gas to be introduced into the chamber 53 even when the chamber 53 is removed from the supply line 71 up to a predeterminable distance. Further details of, for example, the inlet area 52 and the supply line 71 are shown in FIG. 7.

Figure 2:
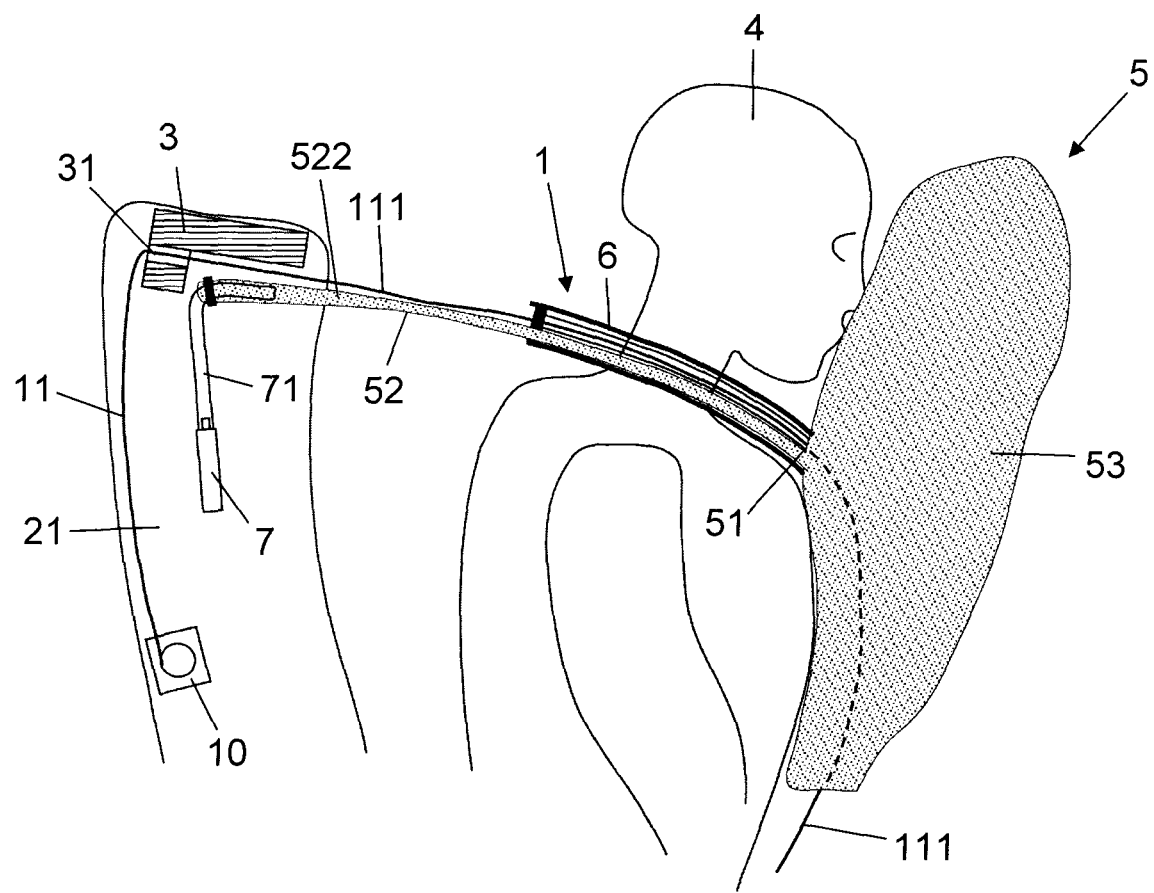

The state of the seat belt arrangement 1 and in particular of the gas bag 5 after or during a collision of the vehicle, i.e. after an at least partial inflation of the gas bag 5, is shown in FIG. 2. The coupling of the gas bag 5 to the seat belt 11 as described above has been effected in such a way that a relative movement between the seat belt 11 and the gas bag 5 is counteracted and the gas bag 5 therefore follows a forward displacement of the vehicle occupant 4 caused by the collision of the vehicle and an associated extension movement of the seat belt 11 and the associated extension of the shoulder portion 111 of the seat belt 11. The gathered portion 521 (initially fixed to the supply line 71) has come loose and released the additional length of the inlet area 52. As a result, despite the forward displacement of the vehicle occupant 4, the introduction of gas into the chamber 53 of the gas bag 5 is not interrupted.

Figure 3:
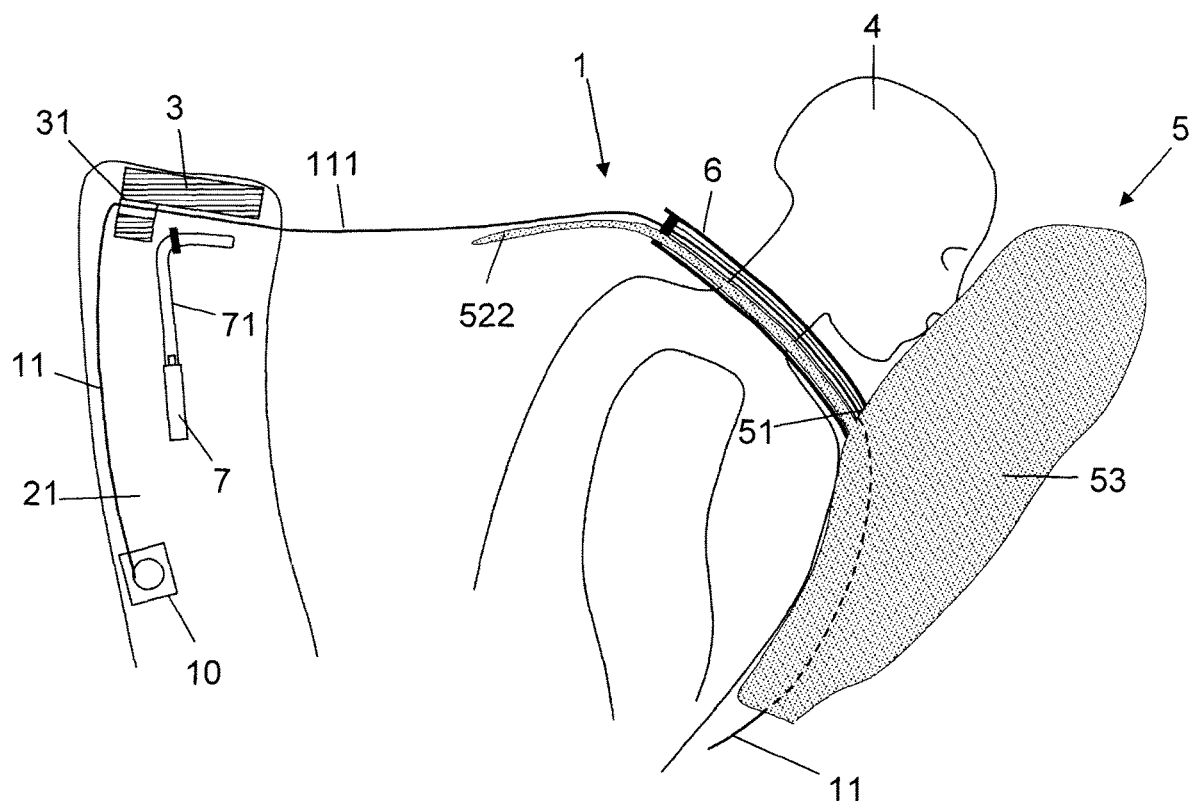

However, when a predetermined extension length of seat belt 11 is exceeded, the end portion 522 of the inlet area 52 of the gas bag 5, which initially is connected to supply line 71, is detached from supply line 71 so that during a further forward displacement of the vehicle occupant 4 no more gas is introduced into the chamber 53 (cf. FIG. 3). The end portion 522 can be provided with a valve which prevents gas from flowing out of the gas bag 5 after the inlet area 52 has been detached from the supply line 71 (see, for example, FIGS. 8 to 10). The extension length of the seat belt 11, at which the detachment of the inlet area 52 from the supply line 71 is effected, in particular depends on the additional length provided by the gathered portion 521 of the inlet area 52.

Figure 4:
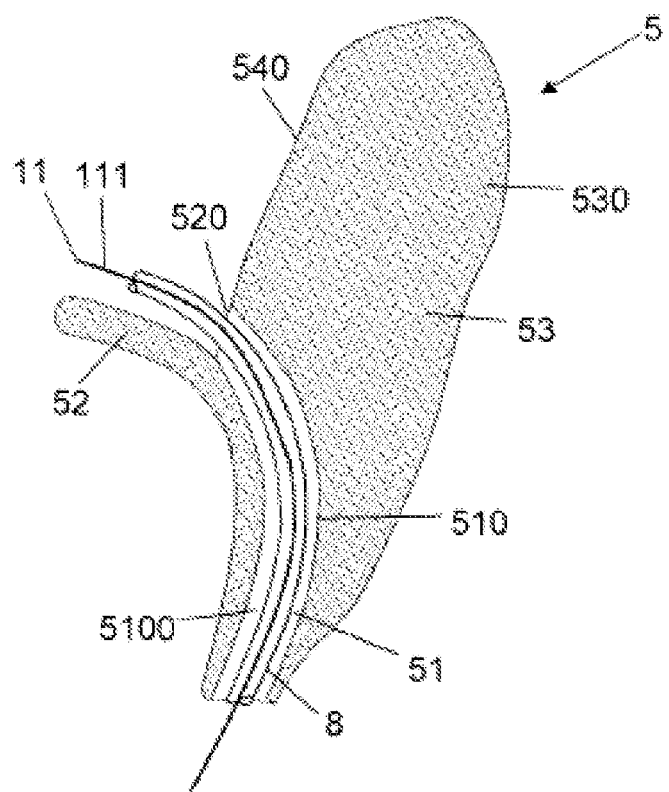
FIG. 4 shows a representation of the gas bag of FIGS. 1 to 3.

FIG. 4 shows the gas bag 5 of FIG. 2 in an enlarged representation. Accordingly, the casing element 8 extends tubularly within the passage 51 of the gas bag 5 and extends beyond the passage 51. It is conceivable that the casing element 8 serves to guide the seat belt 11 outside the passage 51. As already mentioned above, the passage 51 (its wall) can be formed by a flexible element 510 which separates an inner volume 5100 of the passage 51, which is not to be filled with gas, from an inflatable volume 530 of the chamber 53. For example in the region of an opening 520 of the gas bag 5, which forms an access to the passage 51, the flexible element 510 is connected, in particular sewn, to at least one material layer 540 which delimits the inflatable volume 530 of the chamber 53. For example, the opening 520 is arranged in a connecting region of adjacent material layers defining the inflatable volume 530 of the chamber 53. The two mentioned configurations of the opening 520 are also possible for an opening of the gas bag 5 which forms an exit from the passage 51 from which the seat belt 11 exits.

It is possible in addition that an inner side of the casing element 8 at least sectionally and/or at least within the passage 51 is provided with a friction-reducing coating (on the surface indicated by "A" in FIG. 5) in order to provide for a rather unimpeded movement of the shoulder portion 111 of the seat belt 11 relative to the gas bag 5 before an inflation of the gas bag 5. After inflation of the gas bag 5, however, the coupling of the gas bag 5 to the seat belt 11 as described above is effected, wherein in FIG. 4 the pressing of the chamber 53 against the seat belt 11, which brings about the coupling as a result of the internal pressure in the chamber 53, is not shown for reasons of clarity; in particular in order to be able to illustrate the casing element 8.

Figure 5:
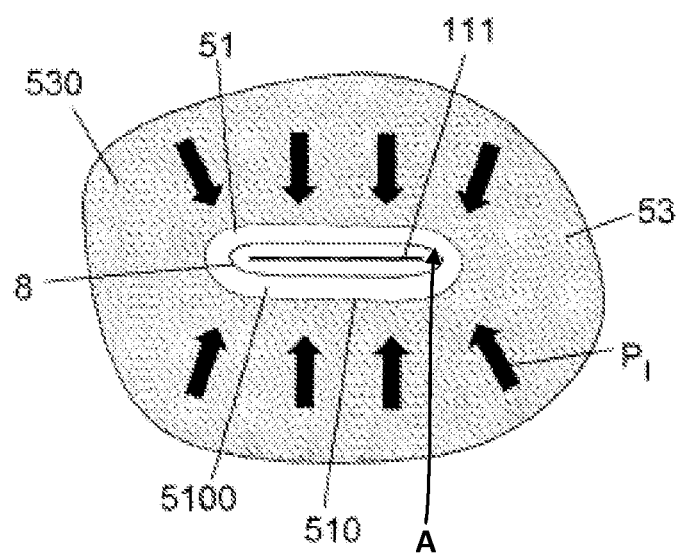
FIG. 5 shows a section through the gas bag of FIG. 4.

The mechanism which leads to the coupling of the chamber 53 to the seat belt 11 is indicated in FIG. 5, which shows a section through the gas bag 5 including the passage 51 of FIG. 4, wherein in FIG. 5 like in FIG. 4, the spacings between the flexible element 510, the casing element 8 and the seat belt 11 are shown on an enlarged scale. Accordingly, an internal pressure Pi in the chamber 53 acts on the flexible element 510 of the passage 51 and hence on the casing element 8, so that the flexible element 510 and the casing element 8 are pressed against the shoulder portion 111 of the seat belt 11 extending in the passage 51, thereby coupling the chamber 53 to the shoulder portion 111.

Figure 6:
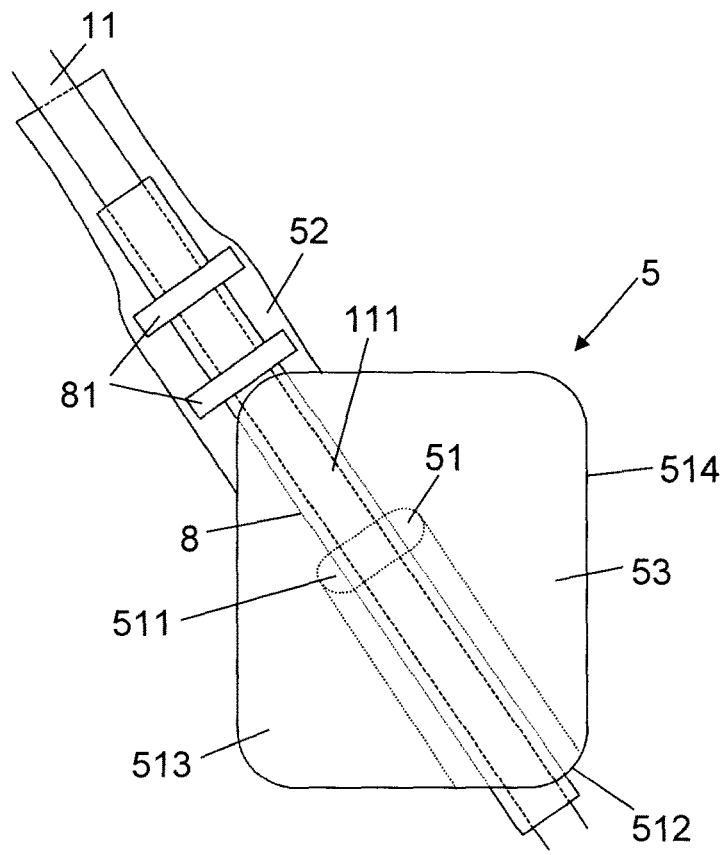
FIG. 6 shows a seat belt arrangement according to the solution, wherein the gas bag is shown in a state spread out flat.

FIG. 6 schematically shows the gas bag 5 of a seat belt arrangement 1 according to the solution (for example, the seat belt arrangement of FIGS. 1-5) in a state spread out flat. Analogously to FIG. 4, the casing element 8 extends out of the passage 51 together with the shoulder portion 111 of the seat belt 11 extending therein and runs in the direction of the backrest 21 along the inlet area 52 of the gas bag 5. It is conceivable that this portion of the casing element 8 is attached to the inlet area 52; for example, via tabs 81.

The casing element 8 and the seat belt 11 extend into the passage 51 through a first opening 511 which is formed in a gas bag layer 513 of the gas bag 5. In particular, the passage 51 is connected to the gas bag layer 513 in the region of the first opening 511. The other end of the passage 51 adjoins a second opening 512 which is formed between two gas bag layers 513, 514 of the gas bag 5; for example, by an interruption of a circumferential seam, via which the two gas bag layers 513, 514 are connected to each other. At least the seat belt 11 leaves the passage 51 via the opening 512.

FIG. 7 shows further components of the seat belt arrangement 1 of FIGS. 1 to 5. The gas bag 5 is shown there before inflation, but in a state spread out flat.

For example, the supply line 71 comprises a rigid end piece 710 which extends into the gathered portion 521 of the inlet area 52 of the gas bag 5. The inlet area 52 is releasably connected to the end piece 710 via a fastening element 711 (for example in the form of a clamping ring). In turn, the gathered portion 521 initially is fixed to the end piece 710 by means of a fixing strap 530. The fixing strap 530 includes a tear seam 531 which tears after coupling of the gas bag 5 to the seat belt 11 and a subsequent extension movement of the seat belt 11 and releases the gathered portion 521.

Moreover, the seat belt arrangement 1 comprises a fixing element 9, to which the outer casing 6 is fixed, and which is releasably connected to the guiding device 3 of the vehicle seat via a connection 90 (for example in the form of a latching connection). Fixing the outer casing 6 to the guiding device 3 also results in a fixation of the gas bag 5 to the guiding device 3. A release of the fixing element 9 (and hence of the gas bag 5) from the guiding device 3 due to an extension movement of the seat belt 11 accompanied by a forward displacement of the vehicle occupant during a collision of the vehicle thus allows the gas bag 5 to move along with the belt extension.

The fixing element 9 comprises a first through opening 91 through which the inlet area 52 of the gas bag 5 extends, and a second through opening 92 in which the seat belt 11 extends. With one end, the casing element 8 is fastened, e.g. hooked, to the fixing element 9 all around the through opening 92. At its end facing away from the fixing element 9, the casing element 8 is connected to the outer casing 6 via the portion 810 protruding from the passage 51; for example, via at least one connecting element in the form of a clamping or latching element 811. In a portion extending between the fixing element 9 and the clamping or latching element 811, the outer casing 6 is provided with a weakened area (e.g. in the form of a tear seam or perforation). The position and size of the weakened area of the outer casing 6 primarily depend on the dimensions of the gas bag 5 and its desired deployment. As a result of the forces occurring during the filling of the gas bag 5, the weakened area is torn open and an opening is created in the casing 6 for the exit of the gas bag 5.

FIG. 7 furthermore reveals that the casing element 8 and the flexible element 510 forming the passage 51 are not flat, but have an undulating structure. As a result, there is a reduced contact area between the casing element 8 and the seat belt 11 prior to inflation of the gas bag 5, and thus as little friction as possible between the casing element 8 and the seat belt 11. Upon activation of the gas bag 5, i.e. in a state of the seat belt arrangement 1 in which coupling of the gas bag 5 to the seat belt 11 is desired, the flexible element 510 and the casing element 8 are pressed against the seat belt 11 and thereby smoothed. The contact area between the casing element 8 is increased correspondingly, so that increased frictional forces act between the seat belt 11 and the casing element 8.

Figure 8:
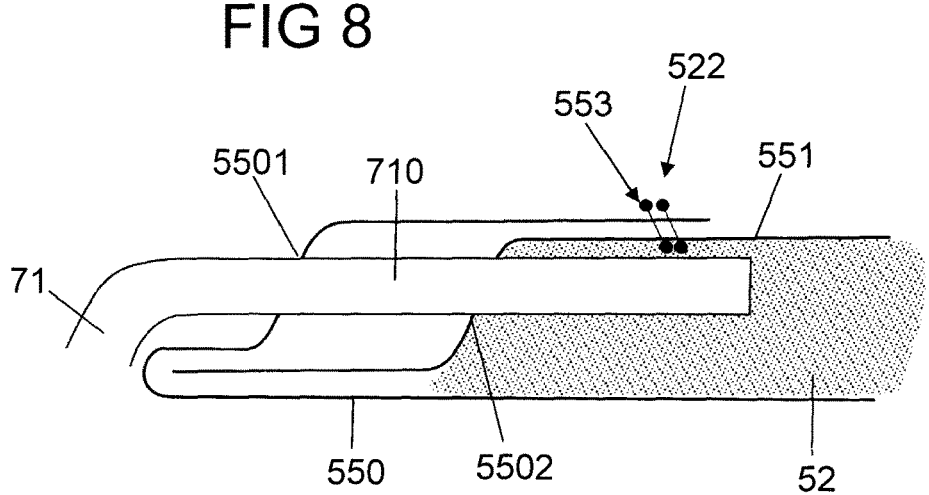
FIG. 8 shows a section through the inlet area of a gas bag of a seat belt arrangement according to the solution.
Figure 9:
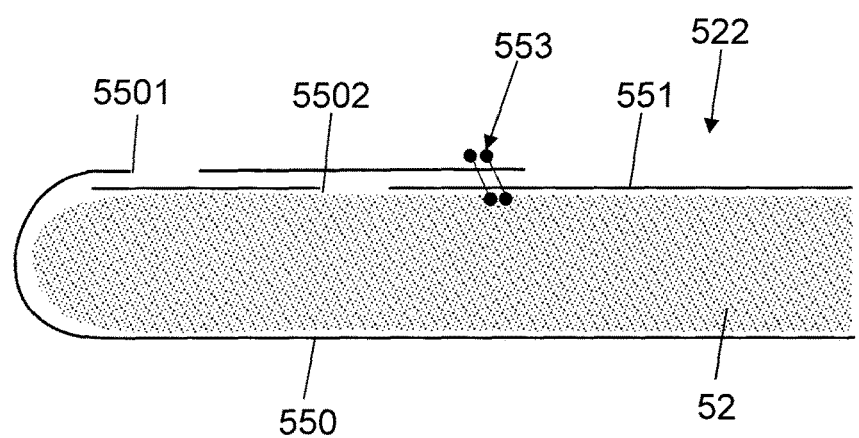
FIG. 9 shows the inlet area of the gas bag of FIG. 8 after being detached from the gas supply line.

FIGS. 8 and 9 show a possible configuration of the end portion 522 of the inlet area 52 of the gas bag 5. Accordingly, the end portion 522 is delimited by two material layers 550, 551, which can also be integrally connected to each other. The first material layer 550 surrounds a portion of the second material layer 551, wherein an end of the first material layer 550 folded back is connected to the second material layer 551 by a seam 553. Further lateral seams 554, 555 (FIG. 10) between the material layers 550, 551 form the (in particular largely gas-tight) inlet area 52 of the gas bag 5.

The first and second material layers 550, 551 each include a through opening 5501, 5502 through which the supply line 71, in particular the rigid end 710 shown above, extends into the interior of the inlet area 52. After activating the gas generator and inflating the gas bag 5 and exceeding the predetermined extension length of the seat belt 11, the inlet area 52 of the gas bag 5 detaches from the supply line 71, as described above.

Figure 10:
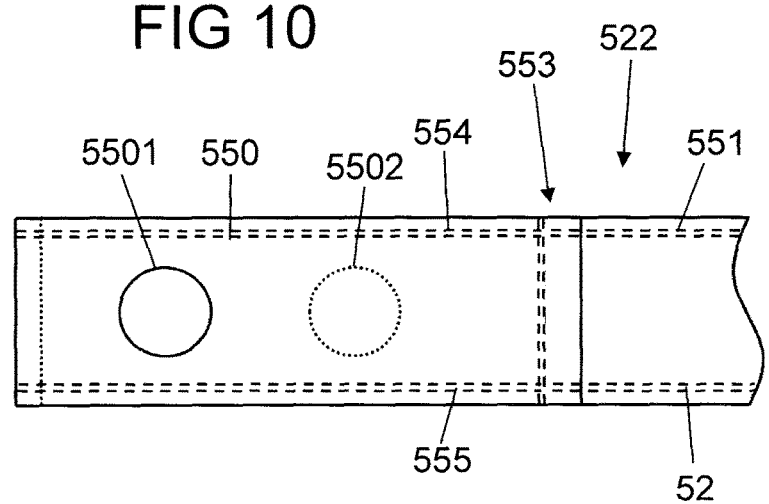
FIG. 10 shows an end of the inlet area of the gas bag of FIGS. 8 and 9 in a state spread out flat.

This state is shown in FIG. 9. The internal pressure in the inlet area 52 presses the second material layer 551 against a portion of the first material layer 550, thereby closing the through openings 5501, 5502. With the through openings 5501, 5502 and their arrangement in the first and second material layers 550, 551, a non-return valve is thus realized, which counteracts an outflow of gas from the inlet area 52 and hence from the gas bag 5. FIG. 10 shows a top view of the end portion 522 of the inlet area 52 of FIG. 9.

FIGS. 11A to 11E show different views of a gas bag 5 according to an exemplary embodiment of the seat belt arrangement according to the solution. Accordingly, the gas bag 5 can include a head area 570 which extends above a thorax area 580. The head area 570 comprises two lateral head chambers 571, 572, each of which can be separated from the remaining head area 570 by a partition. However, it is also conceivable that no such partitions are present. When the head chambers 571, 572 are separated by means of partitions, overflow openings can be provided there, wherein the dimensioning of the overflow openings can be used to set a delay in the filling of the head chambers 571, 572 as compared to the filling of a frontal portion of the head area 570.

Figure 11A:
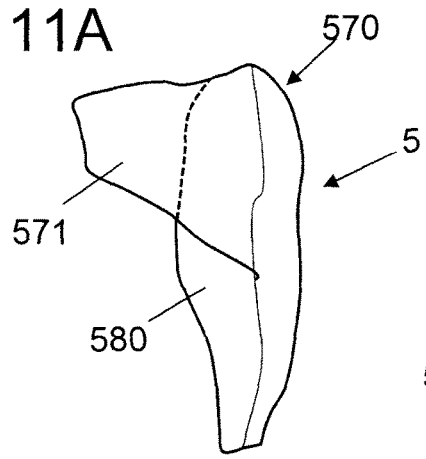
FIGS. 11A to 11E show representations of the gas bag of a seat belt arrangement according to the solution.
Figure 11B:
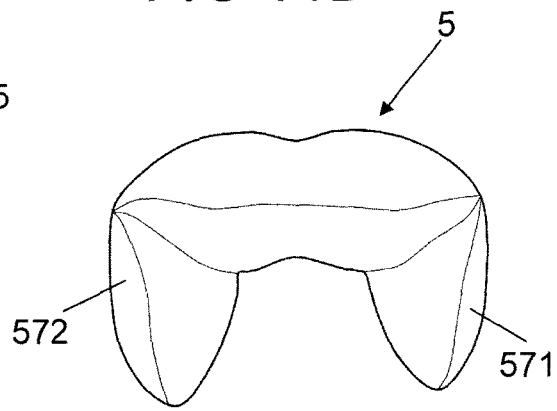
Figure 11C:
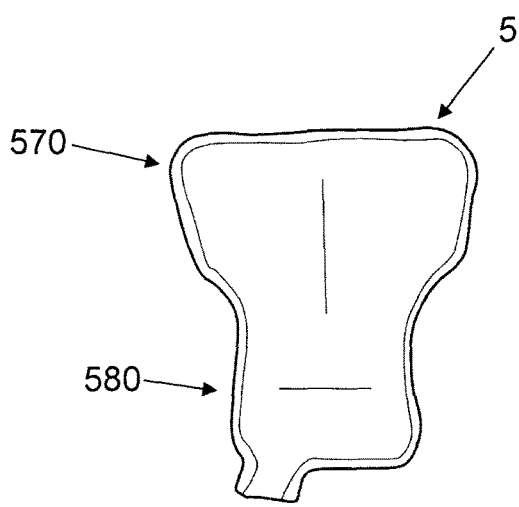
Figure 11D:
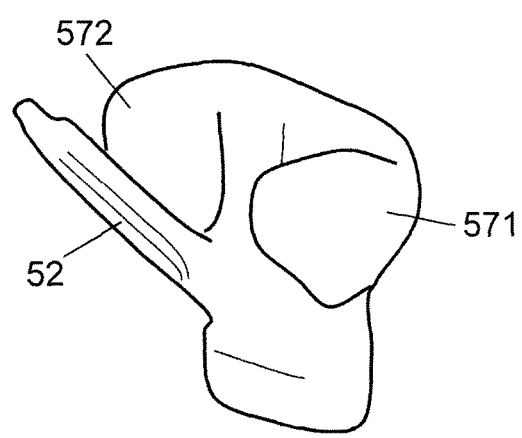
Figure 11E:
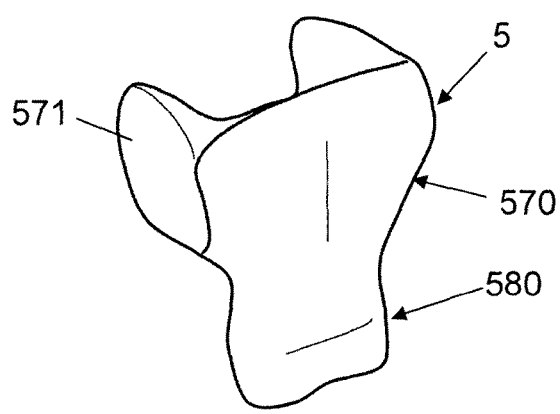
Figure 11F:
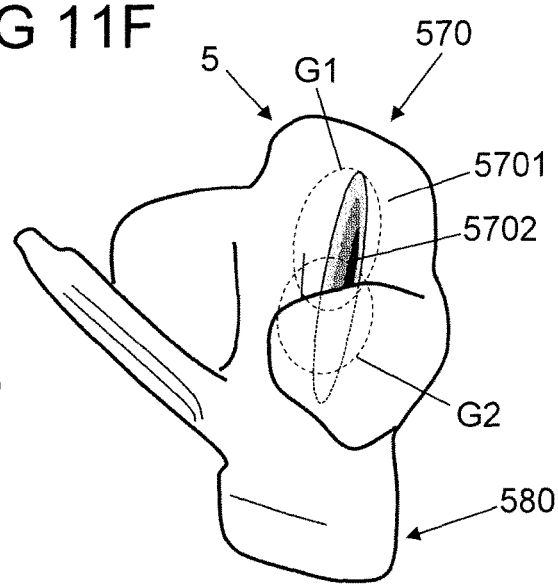
FIG. 11F shows a modification of FIGS. 11A to 11E.

According to FIG. 11F, the head area 570 includes a portion 5701 extending upwards in the vehicle height direction beyond the lateral head chambers 571, 572. Furthermore, the head area 570 is provided with an indentation 5702 which is associated with the impact area of the head of the vehicle occupant during its forward displacement and is intended to reduce the occurring loads on impact of the head. Correspondingly, the indentation 5702 is located between the lateral head chambers 571, 572, wherein it can extend into the upwardly expanded portion 5701 and/or also into the thorax area 580. The indentation 5702 can be configured as an oblong depression (or through opening) extending vertically in the inflated state of the gas bag 5; in particular, to be effective with vehicle occupants of different sizes (indicated in FIG. 11F by the dashed circles G1, G2).

The indentation 5702 can be configured as a non-fillable passage which extends through the entire gas bag 5. However, it is also conceivable that the indentation 5702, as a non-inflatable portion, extends only over part of the thickness of the head area 570 (between the lateral head chambers 571, 572) when viewed from the vehicle occupant. In the illustrated exemplary embodiment, the indentation 5702 is annularly surrounded by portions of the head area 570 and the thorax area 580. As already mentioned above, an element (for example, a flat element) can be arranged in the indentation 5702, which at least partly closes the indentation 5702 and interconnects portions of the gas bag 5 adjacent to the indentation 5702, whereby an expansion of the indentation 5702 upon immersion of the head of the vehicle occupant can be limited.

Figure 12:
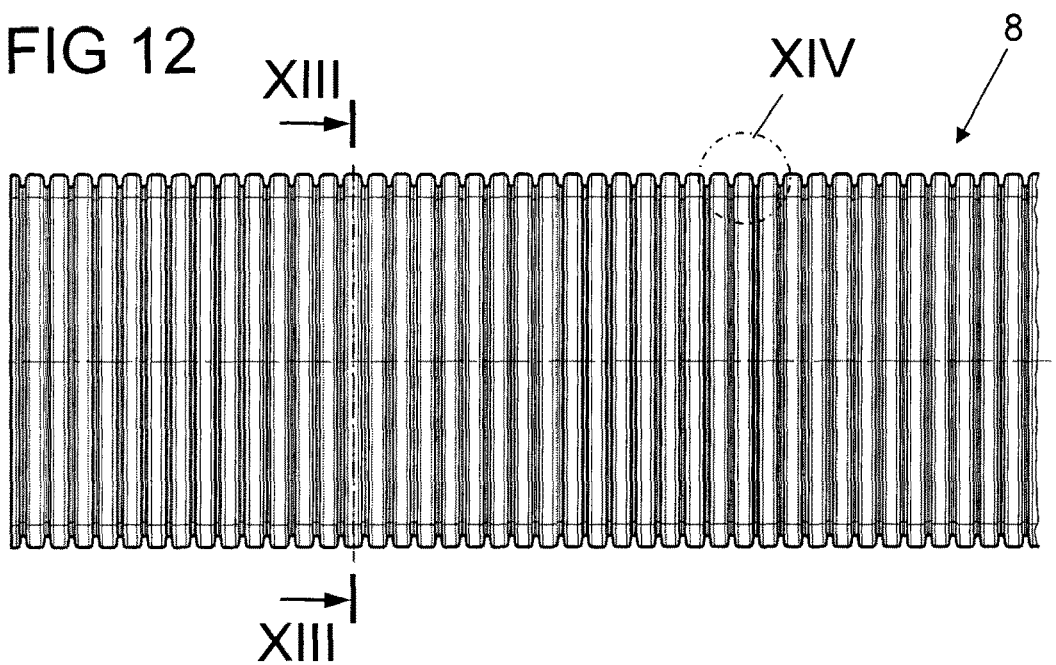
FIG. 12 shows an exemplary casing element in a top view.
Figure 14:
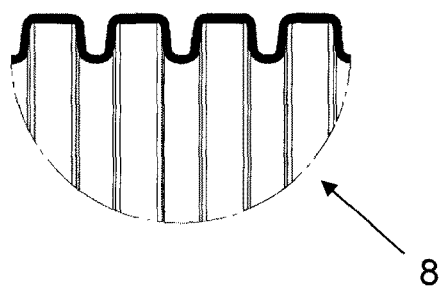
FIG. 14 shows an enlarged section of the casing element of FIG. 12.

FIG. 12 shows an embodiment of the casing element 8 which is modified as compared to FIG. 7. Compared with FIG. 7, the casing element 8 at least sectionally has an undulating structure (viewed along the course of the seat belt) which is significantly more undulated, i.e. has a shorter wavelength and/or a greater amplitude. Accordingly, the spacing between adjacent wave troughs or wave crests of the structure is smaller; e.g., less than 10 mm. The undulating structure can be seen in particular in the enlarged section shown in FIG. 14 (section designated with "XIV" in FIG. 12). For example, the casing element 8 is configured in the manner of a corrugated hose.

Figure 13:
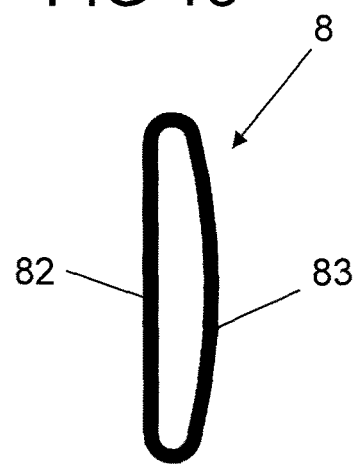
FIG. 13 shows a section through the casing element of FIG. 12.

Furthermore, the side 82 of the casing element 8 facing the vehicle occupant is designed at least approximately flat, while its side 83 facing away from the vehicle occupant extends convexly; cf. FIG. 13, which shows a section along XIII-XIII in FIG. 12. The undulating structure and the concave or planar contour of the casing element 8 can improve the adaptation of the casing element 8 to the body contour of the vehicle occupant in the applied state of the seat belt 11.

Figure 15:
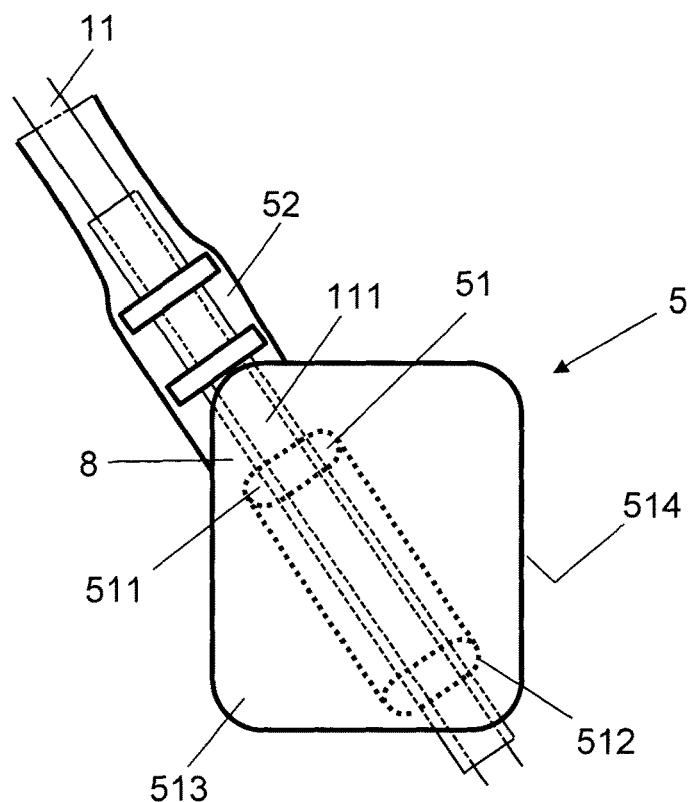
FIG. 15 shows a modification of FIG. 6.

FIG. 15 relates to a first modification of the seat belt arrangement 1 of FIG. 6. In contrast to FIG. 6, the first opening 511, via which the seat belt 11 enters the passage 51, and the second opening 512, via which the seat belt 11 exits from the passage 51, are located in one and the same material layer (gas bag layer) of the gas bag 5; namely in the gas bag layer 514 facing the vehicle occupant. Of course, it is also conceivable that the openings 511, 512 are located in the gas bag layer 513 facing away from the vehicle occupant.

Figure 16:
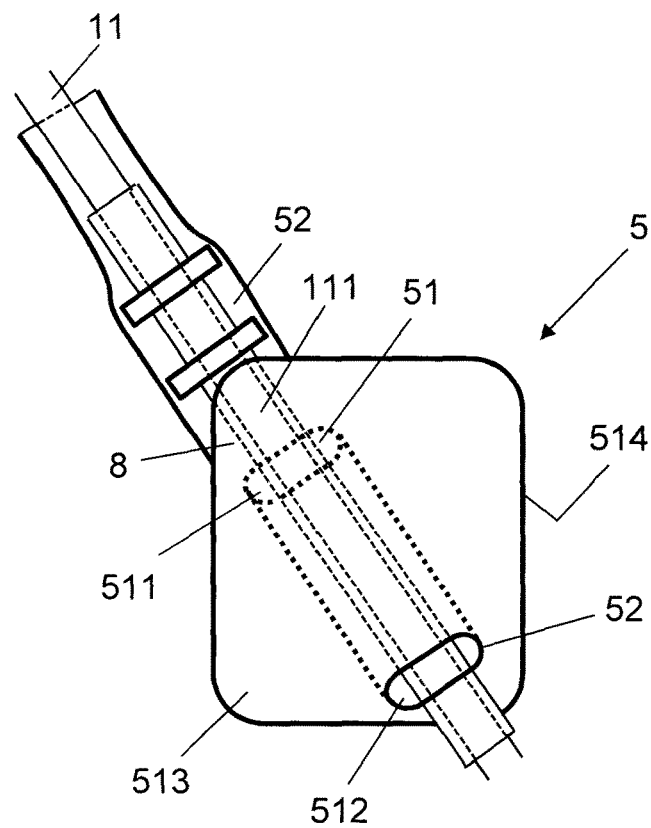
FIG. 16 shows a modification of FIG. 15.

FIG. 16 shows an alternative modification of the seat belt arrangement 1. Accordingly, the two openings 511, 512 are located in different layers of the gas bag 5. The first opening 511 is formed in the gas bag layer 514 facing the vehicle occupant, while the second opening 512 is located in the gas bag layer 513 facing away from the vehicle occupant. It is of course also conceivable that, conversely, the first opening 511 is located in the gas bag layer 513 facing away from the vehicle occupant and the second opening is located in the gas bag layer 514 facing the vehicle occupant.

Figure 17:
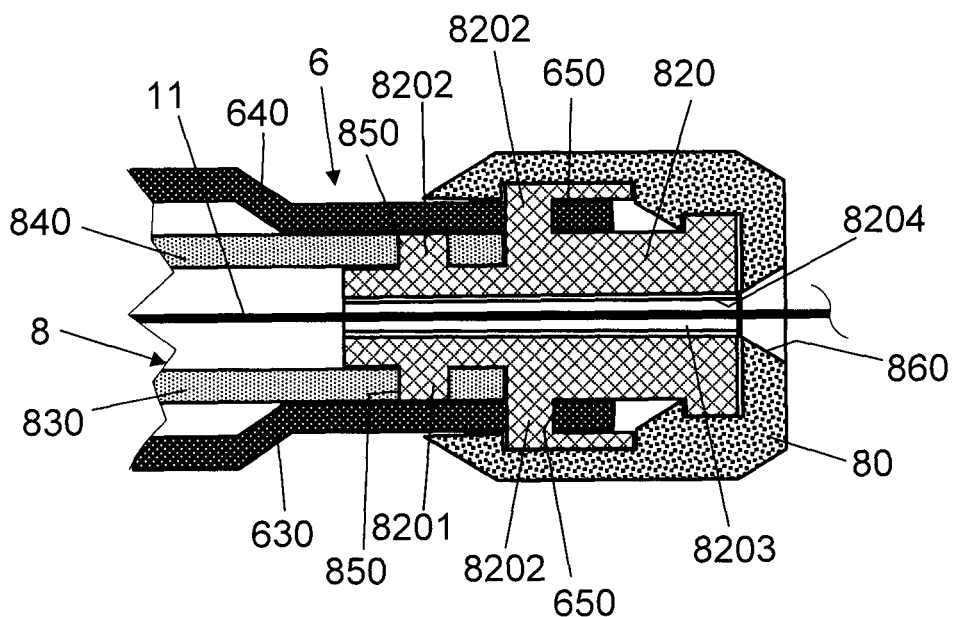
FIG. 17 shows a variant of a connection of the seat belt arrangement.
Figure 18:
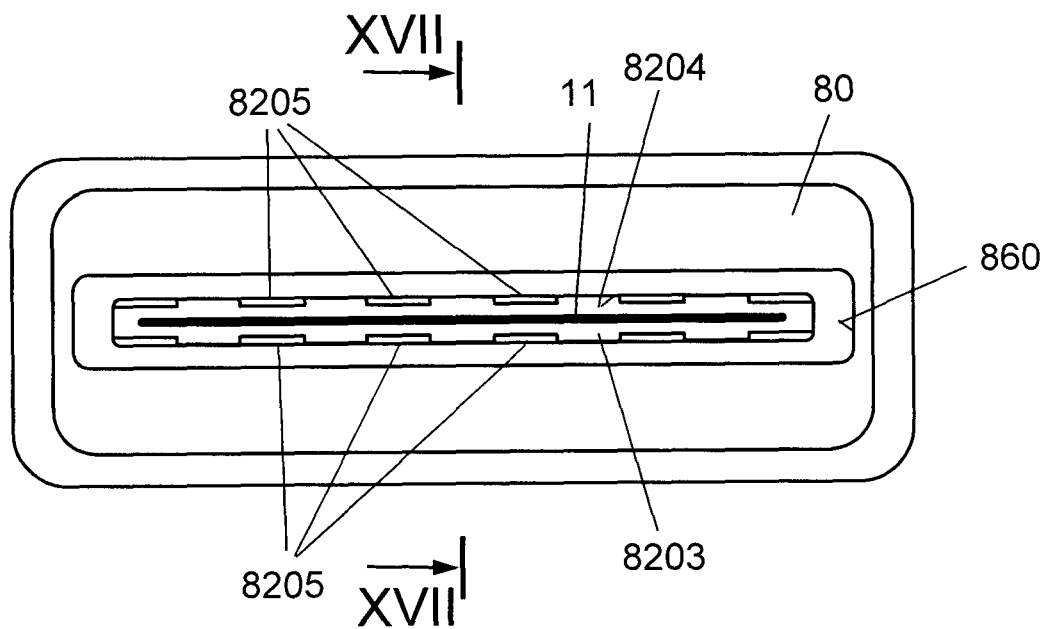
FIG. 18 shows a side view of the connection of FIG. 17.

FIGS. 17 and 18 relate to a configuration of the connection of the seat belt arrangement 1 to the seat belt 11 at its end facing away from the fixing element 9 (cf. FIG. 7), which is modified as compared to FIG. 7, wherein the connection in FIG. 17 is shown in a section and in FIG. 18 in a side view.

In contrast to the connecting element 811 of FIG. 7, the connecting element 820 of FIGS. 17 and 18 each accommodates two portions 830, 840 of the casing element 8 and two portions 630, 640 of the outer casing 6, so that the connecting element 820 provides both a connection of the first portion 830 of the casing element 8 to the first portion 630 of the outer casing 6 and a connection of the second portion 840 of the casing element 8 to the second portion 640 of the outer casing 6.

For coupling to the connecting element 820, the casing element 8 and the outer casing 6 are provided with apertures (openings) 850, 650 which during assembly are brought in engagement with corresponding protrusions 8201 and hooks 8202 of the connecting element 820.

Subsequently, an outer cover element 80 is latched with the connecting element 820, wherein visible components (e.g., the protrusions 8201 and hooks 8202) of the connecting element 820 are concealed (design function). At the same time, the cover element 80 secures the connection of the outer casing 6 and the casing element 8 with the connecting element 820 against re-detachment. It is also conceivable that the cover element 80 urges the casing 6 and the casing element 8 against a portion (e.g., an outer surface) of the connecting element 820. The cover element 80 is made, for example, of metal or a plastic (e.g., by injection molding). In particular, the cover element 80 has a (e.g., non-symmetrical) contour which avoids snagging with the clothing of the vehicle occupant as far as possible.

The connecting element 820 in addition is provided with a slot-shaped through opening 8203 in which the seat belt 11 extends. The cover element 80 includes an opening 860 adjoining the through opening 8203, wherein the seat belt 11 extends both through the opening 8203 and through the opening 860. To minimize friction between the connecting element 820 and the seat belt 11, a wall 8204 of the connecting element 820 adjacent to the through opening 8203 can be provided with (e.g., strip-shaped) protrusions 8205 whose direction of extension is, for example, identical to the direction of extension of the seat belt 11; cf. also FIG. 18. Analogous to the protrusions 8205 of the through opening 8203, protrusions can of course also be present in the through opening 92 of the fixing element 9 (cf. FIG. 7).

Figure 19:
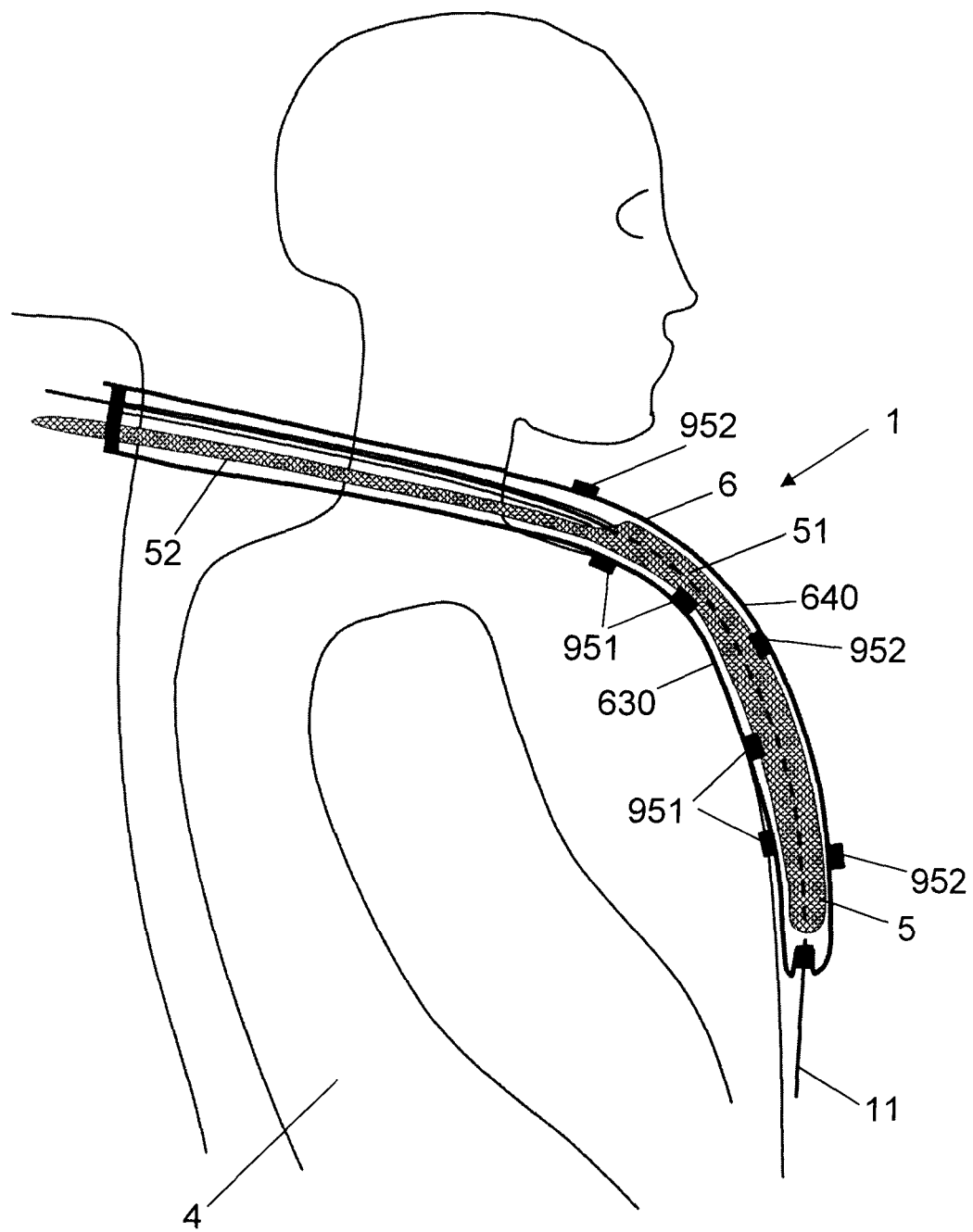
FIG. 19 shows an exemplary embodiment of a sensor array according to another aspect of the solution.

FIG. 19 relates to another aspect of the solution, according to which a plurality of sensors 951, 952 for detecting vital data of the vehicle occupant and/or at least one ambient variable are arranged on the outer casing 6 of the seat belt arrangement 1. The sensors 951, 952 can be located at different mounting positions on the outer casing 6. For example, the sensors 951 are located on a first portion 630 of the outer casing 6 facing the vehicle occupant 4, wherein two of these sensors 951 are located on an outer side of the portion 630 and the other two of the sensors 951 are located on an inner side of the portion 630. The sensors 952, on the other hand, are located on a second portion 640 of the outer casing 6 facing away from the vehicle occupant 4, wherein two of these sensors are located on an outer side and one of the sensors is located on an inner side of the portion 640. The solution is, of course, not limited to a particular number of sensors or particular mounting positions. Rather, the number of sensors and their position is determined by their intended purpose. For example, the sensors 951 arranged on the portion 630 of the outer casing 6 facing the vehicle occupant 4 can be used to determine a heart rate, parameters with respect to breathing, the temperature, and a movement of the vehicle occupant 4. Among the sensors 952 arranged on the portion 640 facing away from the vehicle occupant 4 there are sensors, for example, for determining constituents of the breathing air of the vehicle occupant 4, a microphone, and/or sensors (e.g., in the form of a camera) for observing the surroundings of the vehicle occupant 4.

In order for the sensors 951, 952 to continue to fulfill their function even after a vehicle crash, the seat belt arrangement 1 can include devices which ensure the power supply during and after a forward displacement of the vehicle occupant. For example, there can be an electrical line via which the sensor can be connected to a vehicle electronic system, wherein the electrical line can have an additional length which, when the seat belt is pulled out, allows the gas bag to move along with the seat belt without interrupting the electrical connection between the sensor and the vehicle electronic system. In this case, the electrical line can be applied (for example, laminated) onto the surface of the flexible material forming the outer casing 6 both inside and outside the outer casing 6, or the electrical line extends inside the flexible material, for example as an element woven in, when using an outer casing 6 made of fabric.

It is also possible, as already mentioned above, that the seat belt arrangement 1 includes an energy storage device for storing electrical energy, which is used to supply electrical power to the at least one sensor, and/or comprises a radio module by means of which for example sensor data can be wirelessly transmitted to a receiver. The above-mentioned signal generators can be arranged analogously to the sensors 951, 952.

It should be noted that elements of the exemplary embodiments described above can of course also be used in combination with each other. For example, the gas bag of FIGS. 1 to 5 might be configured according to the model of the gas bag shown in FIGS. 11A to 11F.

The invention claimed is:

1. A seat belt arrangement for a motor vehicle, comprising
at least one seat belt for the protection of a vehicle occupant seated on a vehicle seat;
at least one inflatable gas bag arranged on the seat belt for the protection of the vehicle occupant,
wherein the gas bag includes a passage through which the seat belt extends and to which at least one inflatable chamber of the gas bag adjoins, wherein during or after inflation of the gas bag at least a sub-section of a wall of the passage presses indirectly and/or directly against the seat belt such a way that the gas bag couples to the seat belt and follows an extension movement of the seat belt and hence a movement of the vehicle occupant, and wherein the seat belt is at least partially surrounded by a casing element at least within the passage.

2. The seat belt arrangement according to claim 1, wherein the wall of the passage is formed by a flexible element which at least partly extends through the chamber or adjoins the chamber.

3. The seat belt arrangement according to claim 2, wherein the flexible element is connected to at least one material layer of the chamber which delimits the inflatable volume of the chamber.

4. The seat belt arrangement according to claim 3, wherein an opening is formed in the material layer, wherein the flexible element is connected to the material layer in the region of the opening such that the opening forms an access to the passage.

5. The seat belt arrangement according to claim 2, wherein the inflatable volume of the chamber is delimited by two material layers connected to each other by an edge seam, wherein an opening is formed between the material layers and the flexible element is attached to at least one of the material layers by means of the edge seam and/or a tab of the edge seam such that the opening forms an access to the passage.

6. The seat belt arrangement according to claim 1, wherein the casing element is provided with an inner friction-reducing coating.

7. The seat belt arrangement according to claim 1, wherein the casing element at least sectionally has an undulating structure.

8. The seat belt arrangement according to claim 1, wherein a side of the casing element facing away from the vehicle occupant extends convexly.

9. The seat belt arrangement according to claim 1, wherein a first end of the passage adjoins a first opening of the gas bag and a second end of the passage adjoins a second opening of the gas bag, wherein the seat belt enters the passage via the first opening and exits from the passage through the second opening.

10. The seat belt arrangement according to claim 1, further comprising a fixing element by means of which the gas bag can be attached to a component of a vehicle seat.

11. The seat belt arrangement according to claim 10, further comprising an outer casing which at least partly surrounds the gas bag, wherein the outer casing is fixed to the fixing element.

12. The seat belt arrangement according to claim 1, further comprising an outer casing which at least partly surrounds the gas bag.

13. The seat belt arrangement according to claim 12, further comprising at least one connecting element by which the outer casing and the casing element are connected to each other.

* * * * *